Figure 1:
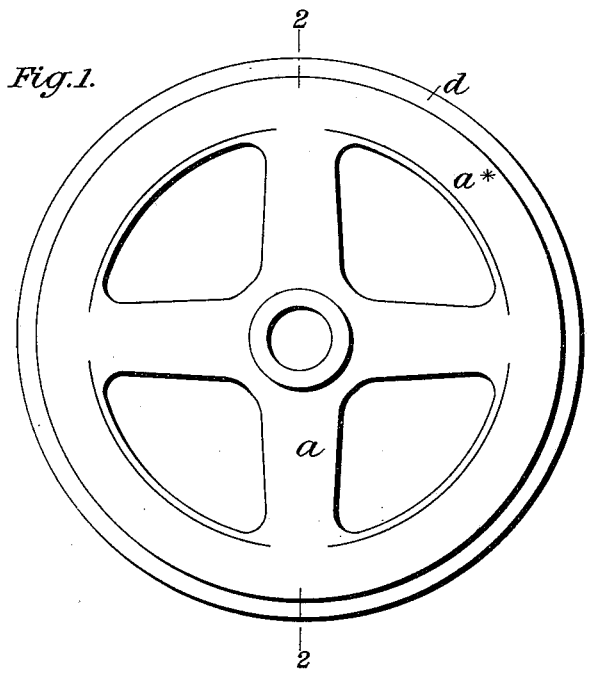

No. 615,059. Patented Nov. 29, 1898.
S. C. DAVIDSON.
ELASTIC TIRED WHEEL.
(Application filed Apr. 1, 1898.)

(No Model.) 2 Sheets—Sheet 1.

WITNESSES:
Fred White
Thomas F. Wallace

INVENTOR
Samuel Cleland Davidson,
By his Attorneys,
Arthur C. Fraser & Co.

THE NORRIS PETERS CO., PHOTO-LITHO., WASHINGTON, D. C.

No. 615,059. Patented Nov. 29, 1898.
S. C. DAVIDSON.
ELASTIC TIRED WHEEL.
(Application filed Apr. 1, 1898.)
(No Model.) 2 Sheets—Sheet 2.
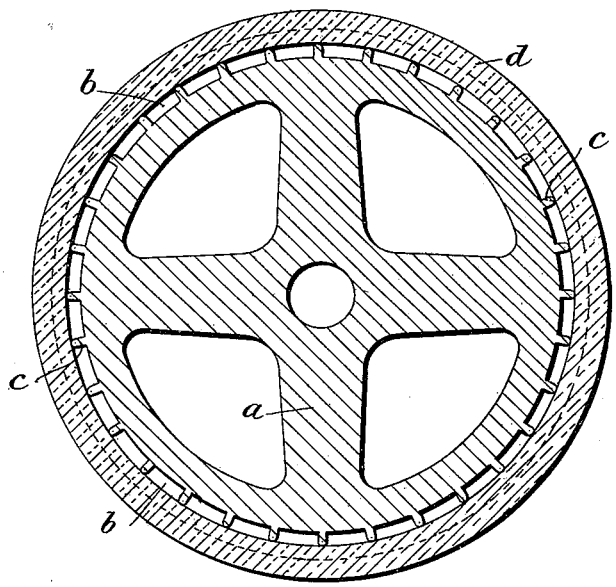
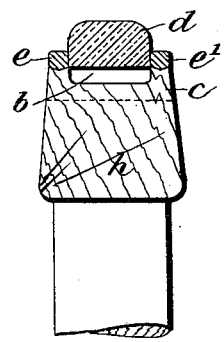
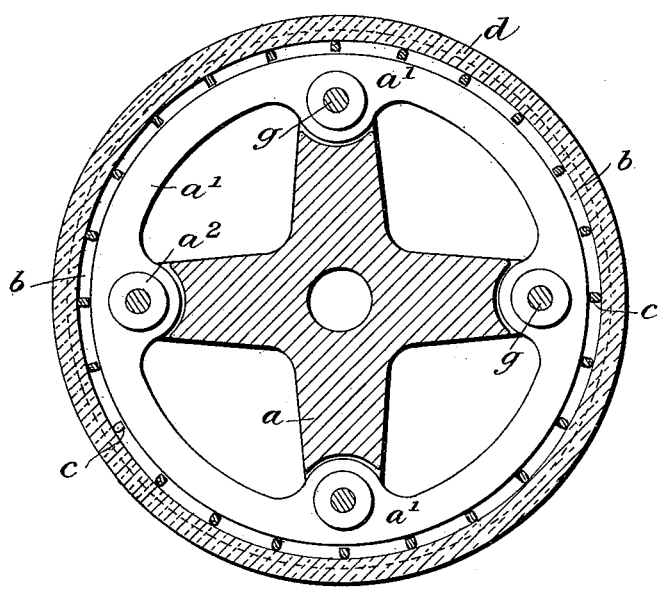
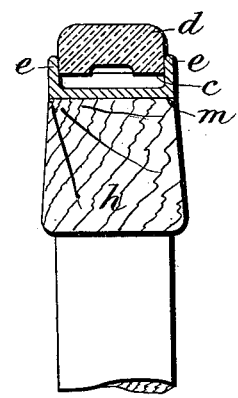
WITNESSES:
Fred White
Thomas F. Wallace
INVENTOR
Samuel Cleland Davidson,
By his Attorneys
Arthur C. Fraser & Co.

UNITED STATES PATENT OFFICE.

SAMUEL CLELAND DAVIDSON, OF BELFAST, IRELAND.

ELASTIC-TIRED WHEEL.

SPECIFICATION forming part of Letters Patent No. 615,059, dated November 29, 1898.

Application filed April 1, 1898. Serial No. 676,039. (No model.)

*To all whom it may concern:*

Be it known that I, SAMUEL CLELAND DAVIDSON, of Belfast, Ireland, have invented certain new and useful Improvements in or Relating to Wheels and Tires for Carriages, Cars, Trucks, and other Vehicles, of which the following is a specification.

My improvements relate to wheels for carriages, cars, trucks, and other vehicles on which tires of india-rubber, leather, or other suitable elastic material are employed to give resilience thereto, the said tires being of what is termed the "non-pneumatic" type, inasmuch as their resilience is not necessarily dependent on the employment of tubes inflated with air under pressure, as in the tires usually known as "pneumatic." One of the practical difficulties attending the use of india-rubber or other elastic tires of the said non-pneumatic type and as hitherto ordinarily mounted on the wheels of carriages, cars, trucks, or other vehicles is that when the wheels have any considerable load to support the tire on same has a tendency to what is known as "creeping," whereby it gradually works itself forward into a loop in front of that part of the wheel-rim which presses the tire upon the roadway or floor, and unless the tire be very rigidly attached to the wheel-rim it soon comes off, and when it be rigidly fastened thereon, with the whole or major part of its inner face bearing against the rim-face, as is usually the case in the method hitherto ordinarily employed for mounting non-pneumatic tires on wheel-rims, the outer portion of the tire, if it extends sufficiently beyond the circumference of the outer edge of the rim to give a reasonably good resilience, gradually develops the said creeping tendency within itself (more especially so in wheels of small diameter, such as truck-wheels) and eventually manages to detach itself from and leave only the rigidly-fastened inner part of the tire remaining upon the wheel-rim, which on being thus deranged by the loss of the outer portion of the tire is rendered practically useless.

The objects, among others, of my invention are to so construct the rims of the said wheels that when an india-rubber or elastic tire is mounted thereon of a suitable size and thickness to impart a good resilience thereto all tendency in the tires to creeping and consequent derangement, as above referred to, is obviated.

Now according to this invention the channel or hollow around the outer face of the wheel-rim and in which the india-rubber or other suitable elastic tire is mounted has across it transverse ledges or bars, (hereinafter called the "rim-bars,") with their circumferential outer edges about midway between the outer edges of the sides of the channel and the bottom of same, so that when the tire is mounted therein its inner face rests upon and is supported by said rim-bars, and its sides are retained in position by the projecting edges of the rim-channel sides beyond the outer circumference of the rim-bars. The rim-bars are preferably spaced at such intervals apart around the rim that the intervening spaces between them are less than the width of the rim-channel, and as it is desirable that the inner face of the tire should press somewhat firmly upon the rim-bars the diameter of the tire is made rather less than the outer circumference of the rim-bars around the wheel, so that the tire has to be more or less stretched in being mounted thereon. When the wheel and tire are thus constructed and put into operation on a vehicle and the outer face of the tire is pressed against the roadway or floor, its inner face is thereby equivalently forced against the rim-bars, and the intermediate parts between the rim-bars being unsupported bulge inward more or less into the spaces between same in the rim-channel. The compressed parts of the tire by thus expanding into these spaces between the rim-bars (instead of being forced in front of the wheel, and gradually accumulating in the form of a loop, as would be the case if the inner face of the tire were completely supported on the outer face of the rim) consequently retain the tire in its normal position upon the rim-bars, and has no tendency to creeping forward around the rim when in use, while at same time the parts which are unsupported between the rim-bars impart to the tire a greater resilience, and in my improved wheels the tires having thus got rid of the hereinbefore-described tendency to creeping are also more durable. The tires may be constructed either solid or with one or more tubular air-spaces therein or with a circumferential groove around the central part of their inner face to give them a still softer resilience.

Figure 2:
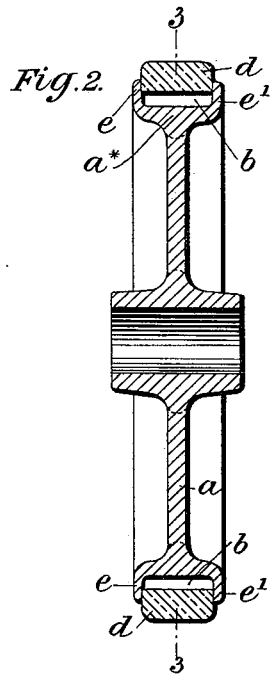
Figure 4:
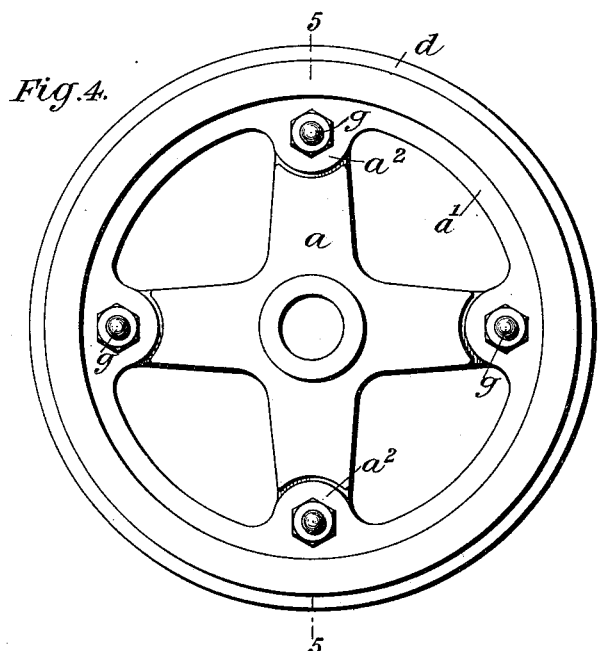
Figure 5:
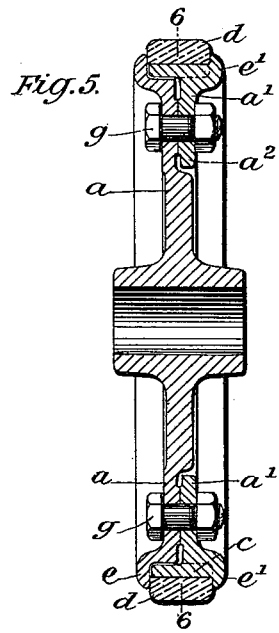

In the accompanying drawings, Figure 1 is an elevation, Fig. 2 a cross-section on the line 2 2 of Fig. 1, and Fig. 3 a section in the plane of the wheel on the line 3 3 of Fig. 2, of a small wheel, such as a truck-wheel, constructed in accordance with my invention. Fig. 4 is an elevation; Fig. 5, a cross-section on the line 5 5 of Fig. 4; and Fig. 6, a section in the plane of the wheel on the line 6 6 of Fig. 5, showing the invention applied to a larger wheel. Figs. 7 and 8 are part cross-sections showing the application of my invention to wheels having wooden fellies.

Referring first to Figs. 1 to 6, $a$ is the wheel, and $a^\times$ the wheel-rim, having on its outer face the rim channel or hollow $b$, in which the india-rubber or other suitable elastic tire $d$ is fitted. The rim channel or hollow $b$ is bounded on either side by the rim-collars or projecting edges $e\ e'$ of the rim, and it is provided with the transverse rim-bars $c$.

As shown in Figs. 1 to 3, the wheel $a$ and rim $a^\times$ may be constructed with the hollow or rim-channel $b$ and with the said rim-collars $e\ e'$ and rim-bars $c$ therein altogether complete as one metal casting, and such construction suits well for trucks or other wheels of small diameter; or, as shown in Figs. 4 to 6, the wheel and wheel-rim may be constructed in two parts by, as it were, splitting the rim in the plane of the wheel and leaving one section $a$ of the rim as an integral part of the body of the wheel (and which section of the wheel is hereinafter called the "main" rim-section) and the other in the form of an annulus $a'$, (hereinafter called the "annulus" rim-section,) with flanges or brackets $a^2$ projecting inwardly in the plane of the wheel, so that same may be bolted by means of bolts $g$ to the body of the main rim-section $a$ of the wheel. In the half-channel or half-hollow $b$ of the annulus rim-section I construct the rim-bars as ledges $c$, and preferably so projecting therefrom that they extend across to the opposite side of the half of the rim channel or hollow $b$ in the main rim-section $a$ when the two sections of rim $a\ a'$ are fastened together, or these rim-bars $c$ may, if preferred, be constructed in each section of the rim and so that they meet each other in the center of the rim when the two sections are united, or, if desired, they may be so placed relatively to one another that the ends of the rim-bars of one rim-section are opposite to the spaces between those of the other. Around the outer edges of each of the said rim-sections I preferably construct the rim-collars either parallel with the plane of the wheel or with a more or less inward bevel toward the tire or with inwardly-projecting lips or flanges thereon, so that when the two rim-sections are screwed or bolted together the edges of the beveled collars or said lips thereon project over and clasp the inner edges of the tire, so that they cannot in the ordinary employment and use of the wheel be easily jumped out of position between same, and the outer edges of the rim-bars being sufficiently inside the circumference of the outer edge or lip of said rim-collars when the inner face of the tire is resting upon the rim-bars there is enough of the tire inside the rim lips or flanges to prevent its being pushed or forced sidewise off the rim-bars and to give it a sufficiently strong resistance against side thrust when going around sharp curves at a high speed or when an obstacle encounters the tire on one side only.

When the rim-bars are altogether constructed upon either of the rim-sections and project across the hollow part of the other rim-section, the tire can easily be mounted upon the rim-bars before attaching the annulus rim-section to the main rim-section, which is a practical advantage that this arrangement of the rim-bars possesses over having them constructed partly on both rim-sections, the mounting of the tire being in this latter case somewhat more difficult to accomplish.

My improved rim, with an india-rubber or elastic tire mounted thereon, may also be constructed on an ordinary wooden wheel for carriages or other road-vehicles. When the tire employed is of a narrower width than the rim-face, as shown in Fig. 7, I form around the outer face of the fellies $h$ of the wheels a continuous channel or hollow $b$ of corresponding width to suit the elastic tire $d$ to be employed thereon. At short and equal intervals apart around the rim I have transverse cuts radially incised across the face of the rim and extending rather deeper than the bottom of said rim-channel, into which transverse cuts I insert strips $c$, of, preferably, hoop-iron of suitable gage and length to exactly fit into same. These constitute the rim-bars, after which metal tires $e$ and $e'$ are shrunk upon the two sides of the rim-channel $b$, so as to leave the channel itself uncovered. These tires should be of sufficient thickness to form retaining-collars to the india-rubber or elastic tire when mounted between same, and when so mounted the inner face of the elastic tire rests on and is supported by the said rim-bars $c$, the operation of which, in preventing any creeping tendency in the elastic tire and keeping it in position on the rim when in use, has already been described.

In the arrangement shown in Fig. 8, where the rubber tire $d$ is but very little narrower than the rim-face, the wooden wheel is fitted with an iron tire $m$, constructed of channel-section, with transverse ledges $c$ to constitute the rim-bars constructed in the bottom part of the channel. The outer edges $e\ e$ of said tire constitute the retaining-collars for the elastic tire $d$ when mounted thereon. The said special construction of channel-iron, when formed into a tire $m$, is then shrunk on, so as to firmly clasp the wooden fellies $h$ of the wheel, with its flat face inward and the channel and transverse rim-bars outward.

What I claim, and desire to secure by Letters Patent, is—

1. In wheels for carriages, cars, trucks or other vehicles, on which india-rubber or other more or less elastic tires are mounted to give resilience thereto, a tire without transverse recesses or projections on its inner face, in combination with a wheel-rim having a hollow or channel around its outer face and transverse rim-bars within said hollow or channel, at suitable distances apart around the rim, said transverse rim-bars supporting the inner face of said tire when mounted on the rim and in said channel, and the sides of said channel projecting beyond the outer radius of said rim-bars and forming retaining-collars, preventing the tire shifting on said bars to either side, substantially as and for the purposes set forth.

2. In wheels for carriages, cars, trucks or other vehicles, on which india-rubber, leather or other more or less elastic tires are mounted to give resilience thereto, a channeled or hollowed wheel-rim with only one side of the hollow integral with said rim, and an annulus secured to said wheel and forming the remaining part of the rim, and transverse ledges constructed either in both sections of the rim, or altogether in one or other of said sections and extending therefrom into the hollow of the other section, in combination with an india-rubber, leather or other elastic tire mounted in the hollow of said rim and with its inner face resting upon said rim bars or ledges, all substantially as and for the purposes set forth.

In witness whereof I have hereunto signed my name in the presence of two subscribing witnesses.

SAMUEL CLELAND DAVIDSON.

Witnesses:
GEORGE GOOLD WARD,
HUGH TAYLOR COULTER.